Dec. 14, 1943.  J. L. JONES  2,336,547
RESIN RECOVERY PROCESS
Filed March 13, 1943
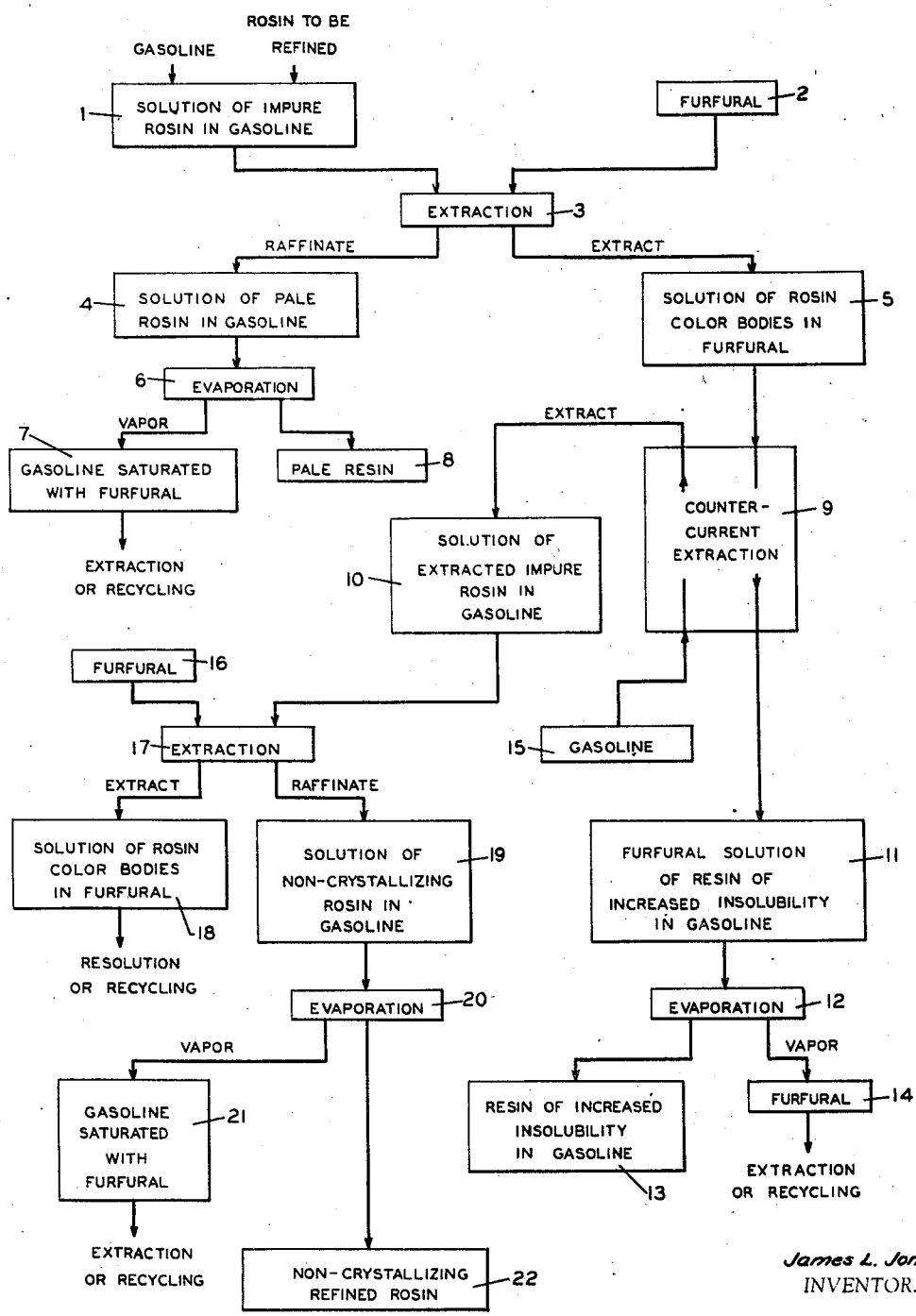
James L. Jones
INVENTOR.
BY Cleveland B. Hollabaugh
ATTORNEY Patented Dec. 14, 1943

2,336,547

UNITED STATES PATENT OFFICE 2,336,547

RESIN RECOVERY PROCESS

James L. Jones, Brunswick, Ga., assignor to Hercules Powder Company, Wilmington, Del., a corporation of Delaware Application March 13, 1943, Serial No. 479,020

9 Claims. (Cl. 260—111)

This invention relates to a method of obtaining useful products from a resinous by-product produced in the refining of wood rosin.

Heretofore in the refining of crude wood rosin to obtain pale wood rosin, as for example in the selective solvent refining process shown in the U. S. patent to Kaiser et al., 1,715,085, wherein a solution of crude wood rosin in gasoline is extracted with furfural which removes the rosin color bodies leaving a solution of pale wood rosin in gasoline, evaporation of the furfural extract yields as a by-product a very dark-colored resin. Disposition of this by-product has been a considerable problem because of its dark color and because it entails a loss of rosin since it contains a substantial quantity of rosin. In the Kaiser et al. patent aforesaid it has been proposed to dissolve this by-product residue in gasoline and thereby extract the gasoline-soluble rosin therefrom. However, this proposal has not found favor in practice because the dark rosin thereby extracted is non-refinable by conventional rosin refining methods such as furfural extraction.

It is an object of the present invention to recover a refinable rosin from the selective solvent extract referred to above.

Another object is to lower the gasoline-soluble content of the by-product resinous material referred to above.

Still other objects will more fully hereinafter appear.

I have discovered that if the extract containing the by-product resin referred to above and obtained by the selective solvent extraction of a light petroleum distillate solution of impure wood rosin with a selective solvent for color bodies therein which is capable of immiscibility with the light petroleum distillate and which may be typified by furfural, is subjected directly to countercurrent extraction with a light petroleum distillate without evaporation of the selective solvent such as furfural, there is obtained as the extract a petroleum distillate solution of a rosin which is capable of being refined by extraction with a selective color body solvent. The rosin extract solution in distillate is in turn extracted by a selective color solvent such as furfural, capable of immiscibility therewith. Upon recovery of the resulting rosin from its solution in the light petroleum distillate, there is obtained a pale grade refined rosin of color grade H or better, which, unlike usual refined wood rosin, is non-crystallizing yet highly soluble in character. This non-crystallizing refined rosin is thus particularly useful in core oils, binding oils, cold cut solutions, etc., where freedom from crystallization is desired. The selective color body solvent solution, obtained after countercurrent extraction with the petroleum distillate, contains a dark resin enhanced in gasoline-insolubility and of increased value in uses depending on this property. This resin is recovered by evaporation of the solvent.

In a typical process of recovering rosin from pine wood, the shredded wood is extracted with hot benzol, the "drop liquor" obtained being composed of benzol, crude terpene oils, and so-called "No. 3 rosin" which is a mixture of gasoline-insoluble resin and FF rosin. This total resinous extract is evaporated to recover the benzol and then to distill off the crude terpene oils, leaving the No. 3 rosin. This No. 3 rosin is then dissolved in a mixture of furfural and gasoline in accordance with Hall 2,221,540 and layer separation effected. The bottom layer which is a solution of gasoline-insoluble pine wood resin in furfural is separated from the upper layer which is a gasoline solution of FF rosin. It is this gasoline solution which constitutes the original solution of crude rosin employed in a typical furfural or other selective solvent refining process, whereby there is obtained as the extract a furfural solution of the dark by-product resinous material referred to above.

In accordance with the present invention, this selective solvent extract solution of rosin color bodies is extracted directly and countercurrently, without evaporation, with a volatile paraffinic hydrocarbon solvent, for example, light petroleum distillate such as gasoline, which dissolves therefrom that portion of the rosin contained therein which is refinable to yield a rosin substantially devoid of tendency to crystallize and which would otherwise be lost in the by-product resin, and the extracted rosin is refined in solution. In this extraction, between about one and about eight parts by weight of the distillate are utilized to extract each part by weight of the selective color body solvent solution.

The extraction of the solution of dark by-product resinous material in furfural or similar selective color body solvent is preferably carried out by introducing the solution of by-product resin in selective solvent to the top of a suitable tower such as a tower packed with suitable contact media, such as 1″ Berl saddles or a screen tower, introducing into the bottom of the tower a light petroleum distillate such as gasoline, and passing the gasoline and the solution of by-product rosin through the tower counter-currently to one another. The gasoline solution of rosin so obtained is removed at the top of the tower while the washed solution in furfural of by-product resin of increased insolubility in gasoline is removed at the bottom.

The gasoline solution or extract obtained from the countercurrent extraction is then in turn treated with or extracted with a selective color body solvent, such as furfural, capable of immiscibility therewith. The extraction may comprise single or repeated extractive treatments but preferably is carried out by a countercurrent extraction with the selective color body solvent carried out in a packed or screen tower in a manner similar to the gasoline extraction previously described. The selective color body solvent brought into contact with the gasoline solution is in a quantity between about one part and about fifteen parts by weight for each ten parts by weight of resin in the solution.

The selective color body solvent is separated from the rosin solution. The refined gasoline solution is then resolved by evaporation into solvent and refined non-crystallizing rosin. The separated color body phase may be resolved into solvent and low grade rosin or preferably will be blended with similar color body extract obtained in the initial extraction of the impure rosin started with, thereby increasing the yield of both the refined non-crystallizing rosin and the gasoline-insoluble resin.

I have found that the process may conveniently be carried out in conjunction with the usual refining operation of crude or impure wood rosin. In the accompanying drawing, there is shown a flow sheet diagram of such a combined process. In accordance with the process represented in the drawing, the crude rosin and gasoline are commingled together to form a solution of impure rosin (block 1). Alternatively, an already existing solution of the crude rosin in gasoline may be employed. This solution and furfural are commingled in any suitable extraction apparatus (block 3), and the phases are separated in the customary manner. The raffinate (block 4) comprises a solution of pale rosin in the gasoline. This is conveniently evaporated to yield a residue of pale rosin (block 8) and a distillate of gasoline saturated with furfural (block 7). Conveniently, this recovered gasoline may be recycled for use in preparing the initial solution of impure rosin.

The extract phase from the initial extraction comprises a solution of the rosin color bodies in the furfural (block 5). This solution may be considered as the starting material in the process of the present invention. This solution is extracted with gasoline (block 15), flowing the gasoline countercurrently to the furfural solution (block 9) in a quantity of one to eight parts by weight of the gasoline per part of furfural solution. Conveniently the gasoline employed for carrying out this extraction may be recycled system gasoline saturated with furfural for best extractive results. Thus, the gasoline of block 7 which is already saturated with furfural may advantageously be employed for carrying out the extraction of the furfural solution of the rosin color bodies (block 9). Following extraction or as a part of extraction, the gasoline phase and the furfural phase are separated. The gasoline phase (block 10) contains the gasoline-soluble portion of the rosin color bodies which is an impure rosin differing from ordinary impure rosin in being refinable to a refined rosin having little or no tendency to crystallize.

The extracted furfural solution of the substantially gasoline-insoluble pine wood resin (block 11) is evaporated (block 12) to recover the furfural (block 14) and to leave as a residue a by-product resin of increased gasoline-insolubility (block 13).

Desirably, the furfural (block 14) obtained by condensing the vapors from the evaporation step is recycled for use in the initial extraction of the impure rosin solution (i. e. is recycled to block 2) or is utilized in part in refining the gasoline extract (i. e., is conveyed to block 16).

The gasoline extract (block 10) obtained by the countercurrent extraction (block 9) of the furfural solution is then extracted (block 17) with furfural (block 16) preferably countercurrently. The raffinate is a solution of refined non-crystallizing rosin (block 19) which is then resolved by evaporation into gasoline solvent saturated with furfural (block 21) and the desired non-crystallizing refined rosin (block 22). The recovered gasoline preferably is recycled in the process in view of its furfural content either to initial impure rosin solution (block 1) or to further extraction (block 15).

The furfural extract of the gasoline extract (block 18) is a solution of rosin color bodies substantially insoluble in gasoline mixed with rosin. It may be resolved into furfural and a low grade rosin, reusing the furfural at any point in the process. Preferably the furfural solution is not resolved but is blended with furfural extract of the initial impure rosin (i. e., recycled to block 5) since with such operation increased yields of non-crystallizing refined rosin (block 22) and substantially petroleum hydrocarbon-insoluble by-product resin (block 13) are obtained.

A typical general procedure in accordance with the present invention comprises contacting one part of the furfural solution of the dark rosin color bodies (the resin by-product referred to above) and containing from 10 to 50% by weight of the by-product resin, with from 1 to 8 parts by weight of gasoline in any type of countercurrent washing apparatus such as a packed tower, whereby there is obtained a gasoline extract containing from about 3% to about 20% by weight of furfural-refinable non-crystallizing rosin and there is left as the raffinate a furfural solution of a resinous material of markedly increased gasoline-insolubility (% gasoline-insoluble raised by from 10% to as much as 50%, i. e., from 20 to 60% to from 60 to 70%). Upon treatment of the gasoline extract by countercurrent washing with about one to about fifteen parts by weight of furfural for each ten parts of resin in the gasoline extract and then evaporating the gasoline from the resulting treated extract, non-crystallizing rosin of Grade H or better is obtained.

While furfural is preferred as the selective solvent, in the extract solution, other selective solvents capable of immiscibility with light petroleum distillate may be used such as aniline, phenol liquefied with water, furfuryl alcohol, ethylene chlorohydrin, ethyl alcohol, methyl alcohol, methyl thiocyanate, methyl lactate, 2-nitro-1-propanol, liquid sulfur dioxide, etc.

As the light petroleum distillate employed in carrying out the process of the present invention I may use any paraffin hydrocarbon or mixture of paraffin hydrocarbons boiling not above the boiling range of kerosene (which has an end boiling point not above 270° C.) and preferably essentially free from aromatic, naphthenic or olefin hydrocarbons. I prefer to use gasoline as the solvent, although butane, pentane, hexane, petroleum ether, V. M. & P. naphtha or any of various gasoline cuts may be used. It is preferred to use a normally liquid petroleum hydrocarbon. I may use what is known commercially as narrow range gasoline having a boiling point range of from about 200° F. to about 270° F. I prefer to use a distillate having an aniline point above 50° C. I may use system gasoline saturated with selective solvent. I use gasoline which is free from dissolved rosin or resinous material as the extractant.

The specific examples following will serve to illustrate the invention.

*Example 1*

A furfural extract of rosin color bodies containing 37.8% of resinous bodies was washed countercurrently four times with gasoline using a ratio of one part of furfural solution to two parts of gasoline. Washing and separation were at 80° F. The gasoline layer contained 8.14% of rosin (40.1% of the resinous bodies in the original furfural extract) analyzing: Lovibond color 80 amber+37 red, 0.18% gasoline-insoluble, melting point of 174.2° F. and an acid number of 156. The rosin color bodies in the original furfural extract contained 56.9% by weight of gasoline-insoluble and had a melting point of 189.8° F. while the resinous material left in the furfural phase after the washing contained 87.2% of gasoline-insoluble resin, had a melting point of 200.8° F. and amounted to 30.96% by weight of the washed furfural phase.

The gasoline extract was then agitated at 80° F. with an equal quantity of furfural and the mixture was permitted to separate into two layers while being cooled to 40° F. The two layers were then separated. Upon evaporation of the gasoline from the gasoline-rosin layer, a refined noncrystallizing rosin of color grade I was obtained.

*Example 2*

Example 1 was duplicated exactly except that only two washes were given and that the ratio employed was four parts of gasoline to one part of furfural solution by weight. The gasoline extract contained 3.88% of rosin (39.9% by weight of the resinous bodies present in the initial furfural extract). This gasoline extract was concentrated to 20% and countercurrently washed with 1 part furfural per part of rosin in the solution treated. The gasoline was evaporated from the resulting rosin solution to obtain noncrystallizing rosin of color grade I.

This application is a continuation-in-part of my application Serial No. 394,781, filed May 23, 1941.

What I claim and desire to protect by Letters Patent is:

1. The process which comprises countercurrently extracting one part by weight of an extraction solution containing from about 10% to about 50% by weight of dark rosin color bodies, said solution constituting the extract obtained by the extraction of impure wood rosin dissolved in a volatile paraffin hydrocarbon solvent with a selective solvent which exerts a selective solvent action upon the color bodies contained in the rosin and which is capable of substantial immiscibility with said paraffin hydrocarbon solvent, with from 1 to 8 parts by weight of volatile paraffin hydrocarbon solvent, to cause said paraffin hydrocarbon solvent to dissolve paraffin hydrocarbon-soluble components therefrom and thereby to form a paraffin hydrocarbon extract containing from about 3% to about 20% by weight of said soluble components, separating the resulting paraffin hydrocarbon phase from the selective color solvent phase, and refining the said paraffin hydrocarbon phase with a selective solvent which exerts a selective action upon color bodies contained in the paraffin hydrocarbon phase and which is capable of substantial immiscibility therewith, to obtain in the treated paraffin hydrocarbon phase a refined rosin of low crystallizing tendency and good solubility.

2. The process which comprises countercurrently extracting one part by weight of a furfural solution containing from about 10% to about 50% by weight of dark rosin color bodies, said solution constituting the extract obtained by the selective solvent extraction of a gasoline solution of impure wood rosin with furfural, with from 1 to 8 parts by weight of gasoline, to cause said gasoline to dissolve gasoline-soluble components therefrom and form a gasoline extract containing from about 3% to about 20% by weight of said components, separating the resulting gasoline phase from the selective solvent phase, and refining said resulting gasoline phase with furfural to obtain a refined rosin of low crystallizing tendency and good solubility.

3. The process which comprises countercurrently extracting one part by weight of an extraction solution containing from about 10% to about 50% by weight of dark rosin color bodies, said solution constituting the extract obtained by the selective solvent extraction of a solution of impure wood rosin in a volatile paraffin hydrocarbon with a solvent which exerts a selective solvent action upon the color bodies contained in the rosin and which is capable of substantial immiscibility with the paraffin hydrocarbon solvent, with from 1 to 8 parts by weight of volatile paraffin hydrocarbon solvent, to cause said hydrocarbon solvent to dissolve soluble components therefrom and form a paraffin hydrocarbon extract containing from about 3% to about 20% by weight of said components, separating the resulting hydrocarbon phase from the selective solvent phase, refining said resulting hydrocarbon phase with a selective color body solvent capable of immiscibility therewith to obtain a refined rosin of low crystallizing tendency and good solubility in the hydrocarbon solution, recovering said rosin of low crystallizing tendency from its solution, and recovering a resinous residue substantially insoluble in paraffin hydrocarbon solvent from the hydrocarbon-extracted selective color solvent solution.

4. The process which comprises countercurrently extracting one part by weight of a furfural solution containing from about 10% to about 50% by weight of dark rosin color bodies, said solution constituting the extract obtained by the extraction of a gasoline solution of impure wood rosin with furfural, with from 1 to 8 parts by weight of gasoline, to cause said gasoline to dissolve gasoline-soluble components from the furfural solution and to form a gasoline extract containing from about 3% to about 20% by weight of said components, separating the resulting gasoline phase from the furfural phase, refining said resulting gasoline phase with furfural to obtain in the gasoline a refined rosin of low crystallizing tendency and good solubility, recovering the said rosin of low crystallizing tendency and good solubility, and recovering a substantially paraffin hydrocarbon-insoluble resin from the gasoline-extracted furfural color body solution.

5. The process which comprises countercurrently extracting one part by weight of an extraction solution containing from about 10% to about 50% by weight of dark rosin color bodies, said solution constituting the extract obtained by the selective solvent extraction of a solution of impure wood rosin in a volatile paraffin hydrocarbon with a solvent which exerts a selective solvent action upon the color bodies contained in the rosin and which is capable of substantial immiscibility with the paraffin hydrocarbon solvent, with from 1 to 8 parts by weight of volatile paraffin hydrocarbon solvent, to cause said hydrocarbon solvent to dissolve soluble components therefrom and form a paraffin hydrocarbon extract containing from about 3% to about 20% by weight of said components, separating the resulting hydrocarbon phase from the selective solvent phase, countercurrently extracting said resulting hydrocarbon phase with from about one to about fifteen parts by weight for each ten parts of resin in said phase of a selective color body solvent capable of immiscibility therewith to obtain a refined rosin of low crystallizing tendency and good solubility in the hydrocarbon solution, recovering said rosin of low crystallizing tendency from its solution, and recovering a resinous residue substantially insoluble in paraffin hydrocarbon solvents from the hydrocarbon-extracted selective color solvent solution.

6. The process which comprises countercurrently extracting one part by weight of a furfural solution containing from about 10% to about 50% by weight of dark rosin color bodies, said solution constituting the extract obtained by the extraction of a gasoline solution of impure wood rosin with furfural, with from 1 to 8 parts by weight of gasoline, to cause said gasoline to dissolve gasoline-soluble components from the furfural solution and to form a gasoline extract containing from about 3% to about 20% by weight of said components, separating the resulting gasoline phase from the furfural phase, countercurrently extracting said resulting gasoline phase with one to fifteen parts by weight of furfural for each ten parts of resin in said phase to obtain in the gasoline a refined rosin of low crystallizing tendency and good solubility, recovering the said rosin of low crystallizing tendency and good solubility, and recovering a substantially paraffin hydrocarbon-insoluble resin from the gasoline-extracted furfural color body solution.

7. A process which comprises extracting a solution of impure wood rosin in a volatile paraffin hydrocarbon solvent with a selective solvent which exerts a selective solvent action upon color bodies contained in the said rosin and which is capable of substantial immiscibility with the paraffin hydrocarbon solvent, separating the selective solvent extract phase containing color bodies from the paraffin hydrocarbon phase containing pale rosin, recovering the pale rosin from its solution, countercurrently extracting 1 part by weight of the separated color solvent phase containing from about 10% to about 50% by weight of the dark rosin color bodies, with from 1 to 8 parts by weight of volatile paraffin hydrocarbon solvent, to cause said paraffin hydrocarbon solvent to dissolve paraffin hydrocarbon-soluble components therefrom and thereby to form a paraffin hydrocarbon extract containing from about 3% to about 20% by weight of said soluble components, separating the resulting paraffin hydrocarbon phase from the selective color solvent phase, and refining the said paraffin hydrocarbon phase with a selective solvent which exerts a selective solvent action upon color bodies contained therein and which is capable of substantial immiscibility therewith, to obtain in the treated paraffin hydrocarbon phase a refined rosin of low crystallizing tendency and good solubility, recovering the said refined rosin, and recovering a resinous residue substantially insoluble in paraffin hydrocarbon solvents from the hydrocarbon-extracted selective color body solvent solution.

8. A process which comprises extracting a solution of impure wood rosin in gasoline with furfural, separating the resulting furfural phase containing color bodies from the gasoline phase containing pale rosin, recovering the pale rosin from its solution, countercurrently extracting 1 part by weight of the furfural phase containing from about 10% to about 50% by weight of a dark rosin, with from 1 to 8 parts by weight of gasoline to cause said gasoline to dissolve gasoline-soluble components therefrom and to form a gasoline extract containing from about 3% to about 20% by weight of said components, separating the resulting gasoline phase from the selective solvent phase, refining said resulting gasoline phase with furfural to obtain a solution of a refined rosin of low crystallizing tendency and good solubility, recovering the said refined rosin from its solution, and recovering a substantially paraffin hydrocarbon-insoluble resin from the first-formed gasoline-extracted furfural phase.

9. A process which comprises forming a solution of impure wood rosin in gasoline, countercurrently extracting the solution with furfural to form a raffinate of pale rosin in gasoline and an extract of about 10% to about 50% by weight of dark rosin in furfural, evaporating the gasoline solution to recover pale rosin and gasoline substantially saturated with furfural, returning the recovered gasoline to the process in a step leading to the formation of a rosin solution; countercurrently extracting the furfural extract with from one to eight times its weight of gasoline to form a gasoline extract solution containing from about 3% to about 20% by weight of rosin extracted from the furfural solution and an extracted furfural solution, evaporating the extracted furfural solution to obtain a dark resin substantially insoluble in petroleum hydrocarbons and furfural substantially saturated with gasoline, returning the recovered furfural to the process in a color-body extraction step; countercurrently extracting the gasoline extract solution containing about 3-20% rosin with from about one to about fifteen parts by weight of furfural for each ten parts of resin in the solution, evaporating the extracted solution to recover a refined rosin of low crystallizing tendency and gasoline substantially saturated with furfural, and returning the gasoline to the process in a step in which a rosin-gasoline solution is formed.

JAMES L. JONES.